July 31, 1951  W. H. PHELPS  2,562,331
AIR CLEANER
Filed May 25, 1949
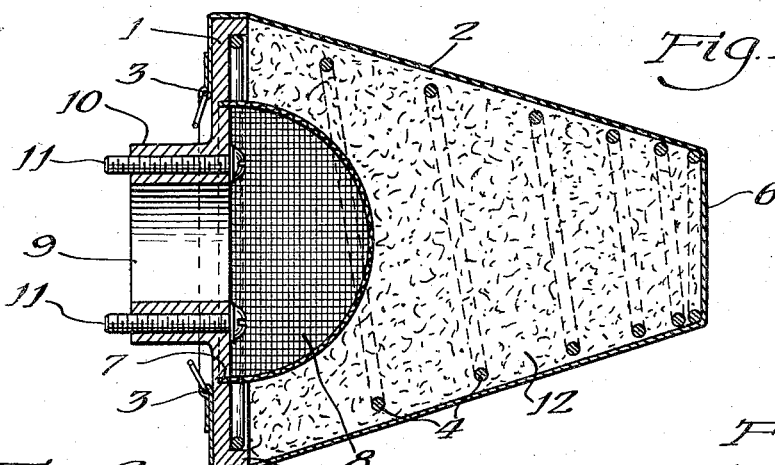
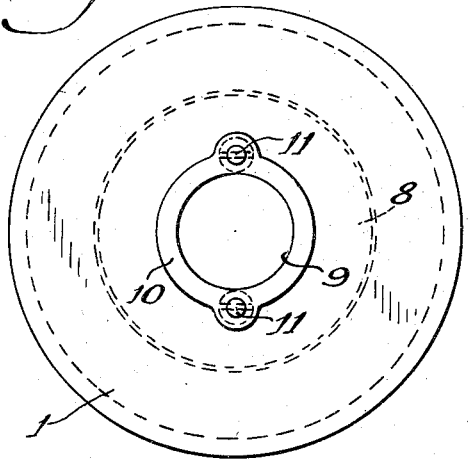
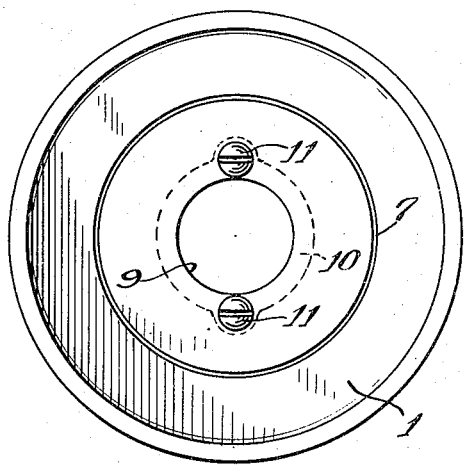
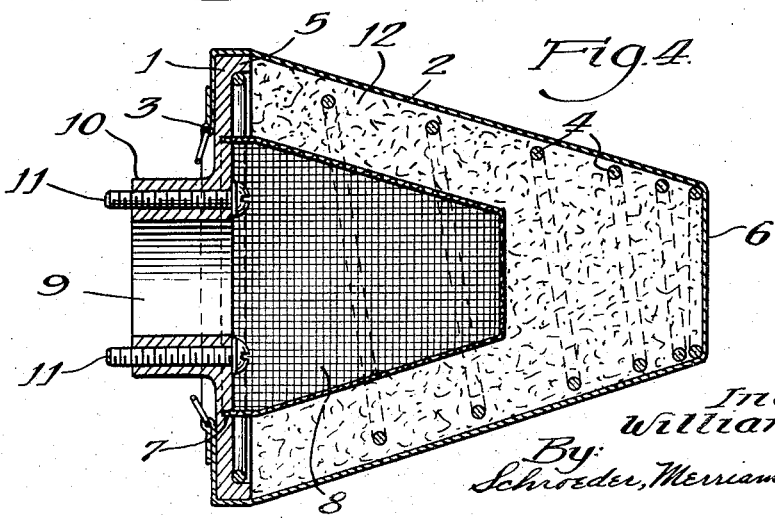
Inventor:
William H. Phelps
By: Schroeder, Merriam, Hofgren & Brady
Attorneys Patented July 31, 1951

2,562,331

UNITED STATES PATENT OFFICE 2,562,331

AIR CLEANER

William Howard Phelps, Ralston, Nebr.

Application May 25, 1949, Serial No. 95,264

1 Claim. (Cl. 183—49)

This invention relates to an air cleaner, and while particularly adapted for use in filtering the air stream into the carburetor of an internal combustion engine using low velocity filtered air, I wish it understood that it may be used in filtering the air stream into air compressors, and in such other connections to which it may be adapted.

An important feature of the present invention is the provision of a bag whose side walls are conically inclined and expanded longitudinally by a conically inclined coil spring which coils, except for the outermost one or two coils, are spaced inwardly from the side walls of the bag to prevent wear of the side walls by the coils, and the coil spring exerts an outward or stretching force on the filter bag to maintain definite porosity in the bag walls. This governs the shape of the bag and enables the bag to be made of one piece of material without the need of sewing or otherwise fastening therein end inserts, gores, or requiring other complicated assembling operations.

This improved construction provides more filtering surface at economical cost, and makes its destruction by bumping virtually an impossibility, as the spring will yield when the filter is struck and immediately return the bag to its original shape when the distorting force is removed. Also in the present air cleaner the air is drawn in from the outside of the bag, the intake air on the inside of the bag being drawn more or less straight into the carburetor over the orifices or jet tubes thereof, thereby affording greater efficiency to the carburetion. By use of the present invention there is secured a high volume of filtered air directly in front of the carburetor or air intake, and by reason of this large volume of filtered air the carburetor will function just as efficiently, insofar as air action is concerned, with the air cleaner on it as it would with no air cleaner attached, and more so because of the removal of dirt. This is true regardless of the direction of the wind or air currents outside of the bag.

Among the objects of my invention are: to provide a novel and improved air cleaner; to provide an air cleaner possessing the advantages pointed out above; to provide an air cleaner having a conical bag with a conical coil spring therein, and novel means for detachably securing the bag to its place of use; to provide an air filter having a stretched bag that may be quickly and easily removed for cleaning and of a nature that it may be carried in stock by dealers and quickly applied to its place of use when desired; to provide an air cleaner having a stretched conical bag of large outside area in which the air is drawn inwardly from the outside to the inside at relatively low velocity at any point on the bag, and which will remain at high efficiency over long periods of time; to provide over the intake opening a hollow screen spaced inwardly from the bag and spring, and filtering material between the hollow screen and bag; and such further objects, advantages and capabilities, inherently possessed by the invention, as will later more fully appear.

The invention is illustrated in a preferred embodiment in the accompanying drawing, in which—

Fig. 1 is a longitudinal section on a median plane of an air cleaner embodying the invention.

Fig. 2 is an end elevation, looking toward the left hand side of Fig. 1, of the supporting plate to which the bag is adapted to be secured.

Fig. 3 is a view similar to Fig. 2, but looking toward the opposite face of the supporting plate.

Fig. 4 is a view similar to Fig. 1, but showing a modified form of inner mesh or screen.

In the embodiment illustrated in Fig. 1, my improved air cleaner comprises in general a supporting plate or disk 1, to which a porous bag 2 is secured by a drawstring 3, arranged in a turned over hem on the back face of the disk, the bag being held taut in distended position by a coil spring 4 which when free extends to a much greater length than shown in drawings, and which when the bag is pulled thereover and secured to the supporting plate 1, is substantially compressed in length so as to hold the bag stretched taut in distended position, as will be understood in Figs. 1 and 4. Supporting plate 1 is provided around its marginal edge with an inwardly extending flange 5 to, in effect, form a depression within which the large end coil of the spring is seated and held against displacement. The small end coil of the spring is held snugly seated within the small end 6 of the bag.

It is an important feature of the invention that the outer surfaces of the coils of the spring, except for the end one or two coils at the small end of the spring, are spaced inwardly from the bag so as to leave a space therebetween so that for nearly the entire length of the spring it is out of contact with the bag, whereby any fluttering action of the bag side walls caused by the intermittent air stream passing therethrough has no tendency to cause wear of the bag side walls against the spring. The spring and supporting plate 1, provide shape and support for the bag to keep it stretched to proper mesh size or porosity at all times, and the spring gives flexibility to the stretched bag and makes it capable of receiving much shock and punishment without lessening its overall efficiency.

The supporting plate 1, on its inner face and a distance inside of the large coil of the spring, is formed with a concentric groove 7 within which is snugly seated the free edge of the large end of the hollow shaped mesh or screen 8 in front of the air intake opening 9 formed in the outstanding neck 10 of the supporting plate. Screws, bolts or other suitable fastening elements 11 pass through openings in the neck and plate, 10, for securing the air cleaner to the air inlet of the carburetor of an internal combustion engine, or other suitable place of use. The space between the hollow screen 8 and the bag is preferably filled with a fibrous filtering material such as hair-like or moss-like material 12, or other suitable porous filtering material, that may, or may not as desired, be oiled or adhesive treated. This material will be loosely positioned around the coils of the spring, and will be compressed when the spring is compressed in fastening the bag thereover.

In Fig. 1 the screen 8 is shown as being semi-spherical in shape, while in Fig. 4 it is shown as being of conical shape and of greater length. The bag 2 may be formed of cloth, paper, or other material suitable for the filtering purposes intended. By using a conically coiled spring as shown in the drawing, the bag can be made from one piece of material without the need of sewing in or attaching end inserts, gores or the like. By having the fastening cord arranged as shown in a hem in the large end of the bag, only one hand is necessary to hold the string taut behind the supporting or base plate while installing the filter bag. I wish it understood, however, that other forms than drawstrings may be used for securing the bag to the base plate, without departing from the spirit of my invention.

It is thus seen that I have provided an efficient, economical, resiliently mounted air cleaner, capable of use with any suitable apparatus the operation of which is improved and longer-lived by the use of filtered air. The resilient mounting enables the distortion of the device without damage thereto from striking objects when used on a movable apparatus such as a lawn mower engine, power bicycle, motorcycle, or the like, as well as the ability to safely absorb shocks when used in a stationary apparatus, or shocks from shipping, or other causes. When dirty from continued use the bag may be easily removed and washed or otherwise cleaned, or replaced with a new one, or cleansed one, as desired.

The foregoing detailed description is given for clearness of understanding only, and no unnecessary limitations should be understood therefrom, for some modifications will be obvious to those skilled in the art.

Having described the invention, I claim:

An air cleaner for filtering air for use in apparatus having moving parts creating a suction, comprising: a supporting plate having a central opening and an annular depression adjacent its edge in one face, said plate also having an annular groove formed in said one face between said annular depression and said central opening, a cup-shaped screen member having its free edges snugly seated in said annular groove and covering said opening, a porous bag on said one face of said plate and having its free marginal edge lapping over the other face of the plate, securing means for holding said marginal edge to said plate, a coil spring in said bag held under compression between said plate and the end of the bag to hold the bag stretched in extended position, the bag and spring being of frusto-conical shape with the bag side walls being spaced from the spring except at the small end thereof, and filtering material in the space between the screen member and the bag, the large end of the spring being seated in said annular depression.

WILLIAM HOWARD PHELPS.

REFERENCES CITED

The following references are of record in the file of this patent:

UNITED STATES PATENTS

| Number | Name | Date |
| --- | --- | --- |
| 1,324,635 | Ascoli | Dec. 9, 1919 |
| 1,702,804 | Winslow | Feb. 19, 1929 |
| 2,162,043 | Westlund | June 13, 1939 |
| 2,183,616 | Korte | Dec. 19, 1939 |

FOREIGN PATENTS

| Number | Country | Date |
| --- | --- | --- |
| 219,981 | Great Britain | Aug. 27, 1925 |
| 6,911 | Sweden | June 6, 1896 |